US012412542B2

(12) United States Patent
Xu et al.

(10) Patent No.: US 12,412,542 B2
(45) Date of Patent: Sep. 9, 2025

(54) DISPLAY DEVICE AND DRIVING METHOD THEREOF, AND MOBILE TERMINAL FOR DISPLAY UNIFORMITY

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Fengcheng Xu, Guangdong (CN); Jinfeng Liu, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/426,740

(22) PCT Filed: Jul. 13, 2021

(86) PCT No.: PCT/CN2021/106031
§ 371 (c)(1),
(2) Date: Apr. 3, 2024

(87) PCT Pub. No.: WO2022/262042
PCT Pub. Date: Dec. 22, 2022

(65) Prior Publication Data

US 2024/0242687 A1 Jul. 18, 2024

(30) Foreign Application Priority Data

Jun. 18, 2021 (CN) ......................... 202110680540.9

(51) Int. Cl.
*G09G 3/36* (2006.01)
*G09G 3/20* (2006.01)

(52) U.S. Cl.
CPC ......... *G09G 3/3607* (2013.01); *G09G 3/2096* (2013.01); *G09G 3/3648* (2013.01);
(Continued)

(58) Field of Classification Search
CPC .. G09G 3/3607; G09G 3/2096; G09G 3/3648; G09G 2310/0251; G09G 2320/0233; G09G 2320/0673
See application file for complete search history.

(56) References Cited

U.S. PATENT DOCUMENTS

2005/0253831 A1 11/2005 Yamada
2014/0375704 A1* 12/2014 Bi ........................ G09G 3/3275 345/694

(Continued)

FOREIGN PATENT DOCUMENTS

CN 103310752 A 9/2013
CN 105573350 A 5/2016

(Continued)

*Primary Examiner* — Kwang-Su Yang
(74) *Attorney, Agent, or Firm* — Rivka Friedman

(57) ABSTRACT

A display device includes a display unit and a driving circuit. The display unit includes a plurality of display regions. The driving circuit is configured to drive the display unit. The driving circuit includes a drive module. The drive module includes algorithms which are respectively correspond to the plurality of display regions one to one. A driving method of a display device, and a mobile terminal are also provided.

12 Claims, 8 Drawing Sheets

(52) U.S. Cl.
CPC ............... *G09G 2310/0251* (2013.01); *G09G 2320/0233* (2013.01); *G09G 2320/0673* (2013.01)

(56) References Cited

U.S. PATENT DOCUMENTS

| | | | | |
|---|---|---|---|---|
| 2015/0029202 | A1* | 1/2015 | Yanagida | G09G 3/3611 345/530 |
| 2015/0248865 | A1 | 9/2015 | Lim | |
| 2018/0233096 | A1 | 8/2018 | Zhao | |
| 2020/0126497 | A1* | 4/2020 | Wang | G09G 5/10 |
| 2022/0223081 | A1* | 7/2022 | Furihata | G09G 3/20 |

FOREIGN PATENT DOCUMENTS

| | | | |
|---|---|---|---|
| CN | 106652954 | A | 5/2017 |
| CN | 106710560 | A | 5/2017 |
| CN | 109559696 | A | 4/2019 |
| CN | 112863456 | A | 5/2021 |

* cited by examiner

DISPLAY DEVICE AND DRIVING METHOD THEREOF, AND MOBILE TERMINAL FOR DISPLAY UNIFORMITY

TECHNICAL FIELD

The present disclosure relates to a field of display technology, and more particularly to a display device, a driving method of the display device, and a mobile terminal.

BACKGROUND

With a rapid development of science and technology in current society, electronic products including mobile phones, computers and TVs are widely used in aspects of life. Electronic display screens (LCD) such as liquid crystal display panels and organic light-emitting semiconductors (OLED) are widely used.

In conventional thin film transistor liquid crystal display products different resistance-capacitance (RC) loads of data lines and scan lines at the far and near terminals easily form a charging difference, which leads to problem of uneven display of the display panel. A conventional method to solve this problem is to adjust a phase of data signals and scanning signals to maintain charging time of each region of a liquid crystal panel near an optimal time. However, the conventional method is difficult to ensure that all scan signals and data signals are adjusted to an optimal charging time. The charging time of each region of the liquid crystal panel is different, which makes display of the liquid crystal panel uneven. Simultaneously, the conventional method further needs to be adjusted for each scan signal and data signal, which result in a complicated adjustment process and low efficiency.

SUMMARY

Technical Problem

Embodiments of the present disclosure provide a display device and a driving method of the display device, and a mobile terminal, which effectively improve display uniformity and improve the display quality of the display panel.

Solution to Problem

Technical Solution

In order to achieve the above effects, the embodiments of the present disclosure provide following technical solutions:

The present disclosure provides a display device, the display device includes:

A display unit, the display unit includes a plurality of display regions.

A driving circuit, configured to drive the display unit, and the driving circuit includes a drive module.

Wherein the drive module includes algorithms which are respectively correspond to the plurality of display regions one to one, and the drive module outputs a source driving voltage to a display region selected from the plurality of display regions according to an image data of the display region and an algorithm corresponding to the display region.

In the display device provided by the embodiments of the present disclosure, the display unit includes sub-pixels arranged in an array, and the display region selected from the plurality of display regions includes one row of the sub-pixels or multiple adjoining rows of the sub-pixels.

In the display device provided by the embodiments of the present disclosure, the drive module further includes a register, and the algorithms are stored in the register.

In the display device provided by the embodiments of the present disclosure, the drive module further includes a selection module and a source driving chip, the driving circuit further includes a timing control module, and the timing control module includes a signal output module.

The signal output module outputs selection signals to the selection module. The selection module controls the algorithms corresponding to the display regions to output a gamma voltage to the source driver chip according to the selection signals.

The source driving chip drives the sub-pixels corresponding to the display regions to charge through the gamma voltage.

In the display device provided by the embodiments of the present disclosure, the driving circuit further includes a timing control module, the timing control module includes an obtaining module, a judgment module, and a gamma voltage output module.

The obtaining module is configured to obtain an actual image data of the sub-pixels in the display regions.

The judgment module is configured to determine whether the actual image data is equal to a preset ideal image data, on the condition that the actual image data of the sub-pixels in the display regions is not equal to the preset ideal image data, the judgment module will output an adjustment signal to the gamma voltage output module.

The gamma voltage output module adjusts an adjustment gamma voltage outputted to the register after receiving the adjustment signal, until an obtained actual image data of the sub-pixels in the display regions is equal to the preset ideal image data.

The timing control module adjusts the algorithms in the register according to an adjusted adjustment gamma voltage.

In the display device provided by the embodiments of the present disclosure, the judgment module includes a storage sub-module, and the preset ideal image data is stored in the storage sub-module.

In the display device provided by the embodiments of the present disclosure, the algorithms include a way to obtain a driving voltage by a gamma table, the gamma table includes a gamma curve, and the gamma curve is a relationship curve between a data signal voltage and a grayscale brightness.

In the display device provided by the embodiments of the present disclosure, two adjoining gamma tables include different gamma curves.

The embodiments of the present disclosure provides a driving method of a display device, and the driving method includes steps of:

S10: providing algorithms respectively corresponding to display regions of the display device one to one.

S20: outputting a source driving voltage to a display region selected from the display regions according to an image data of the display region and an algorithm corresponding to the display region.

In the driving method of a display device provided by the embodiments of the present disclosure, the display device includes a display unit, the display unit includes sub-pixels arranged in an array, and the display region includes one row of the sub-pixels or multiple adjoining rows of the sub-pixels.

In the driving method of a display device provided by the embodiments of the present disclosure, the step S10 includes:

S11: obtaining an actual image data of the sub-pixels in the display regions.

S12: determining whether the actual image data is equal to a preset ideal image data.

S13: on the condition that the actual image data of the sub-pixels in the display regions is not equal to the preset ideal image data, adjusting a source driving voltage provided to the display regions.

S14: repeating steps S11-S13 until an obtained actual image data of the sub-pixels in the display regions is equal to the preset ideal image data, and forming the algorithms corresponding to the display regions according to the actual image data of the sub-pixels in the display regions and the source driving voltage provided to the display regions.

In the driving method of a display device provided by the embodiments of the present disclosure, the step S20 includes:

S21: a signal output module of the display device outputting selection signals to a selection module of the display device.

S22: the selection module selecting the algorithms corresponding to the display regions according to the selection signals, and outputting a gamma voltage to a source driver chip of the display device.

S23: the source driving chip outputting the source driving voltage to drive the sub-pixels corresponding to the display regions to charge.

The present disclosure provides a mobile terminal, the mobile terminal includes a terminal body and display device, the terminal body is electrically connected to the display device, the display device includes:

A display unit, the display unit includes display regions.

A driving circuit, configured to drive the display unit, and the driving circuit includes a drive module.

The drive module includes algorithms which are respectively correspond to the plurality of display regions one to one, and the drive module outputs a source driving voltage to a display region selected from the plurality of display regions according to an image data of the display region and an algorithm corresponding to the display region.

In the mobile terminal provided by the embodiments of the present disclosure, the display unit includes sub-pixels arranged in an array, and the display region selected from the plurality of display regions includes one row of the sub-pixels or multiple adjoining rows of the sub-pixels.

In the mobile terminal provided by the embodiments of the present disclosure, the drive module further includes a register, and the algorithms are stored in the register.

In the mobile terminal provided by the embodiments of the present disclosure, the drive module further includes a selection module and a source driving chip, the driving circuit further includes a timing control module, and the timing control module includes a signal output module.

The signal output module outputs selection signals to the selection module.

The selection module controls the algorithms corresponding to the display regions to output a gamma voltage to the source driver chip according to the selection signals.

The source driving chip drives the sub-pixels corresponding to the display regions to charge through the gamma voltage.

In the mobile terminal provided by the embodiments of the present disclosure, the driving circuit further includes a timing control module, the timing control module includes an obtaining module, a judgment module, and a gamma voltage output module.

The obtaining module is configured to obtain an actual image data of the sub-pixels in the display regions.

The judgment module is configured to determine whether the actual image data is equal to a preset ideal image data, on the condition that the actual image data of the sub-pixels in the display regions is not equal to the preset ideal image data, the judgment module will output an adjustment signal to the gamma voltage output module.

The gamma voltage output module adjusts an adjustment gamma voltage outputted to the register after receiving the adjustment signal, until an obtained actual image data of the sub-pixels in the display regions is equal to the preset ideal image data.

The timing control module adjusts the algorithms in the register according to an adjusted adjustment gamma voltage.

In the mobile terminal provided by the embodiments of the present disclosure, the judgment module includes an storage sub-module, and the preset ideal image data is stored in the storage sub-module.

In the mobile terminal provided by the embodiments of the present disclosure, the algorithms include a way to obtain a driving voltage by a gamma table, the gamma table includes a gamma curve, and the gamma curve is a relationship curve between a data signal voltage and a grayscale brightness.

In the mobile terminal provided by the embodiments of the present disclosure, two adjoining gamma tables include different gamma curves.

Advantageous Effect of Present Disclosure

Advantageous Effect

In the present disclosure, algorithms which are respectively correspond to the plurality of display regions one to on are set in a drive module, and the drive module outputs a source driving voltage to a display region selected from the plurality of display regions according to an image data of the display region and an algorithm corresponding to the display region. Therefore, the display device provided by the present disclosure can effectively improve the display uniformity and improve the display quality of the display device.

BRIEF DESCRIPTION OF DRAWINGS

Description of Drawings

The embodiments of the present disclosure will be described hereinafter with reference to the accompanying drawings, the technical solutions and the beneficial effects of the present disclosure will be obviously.

Figure 1:
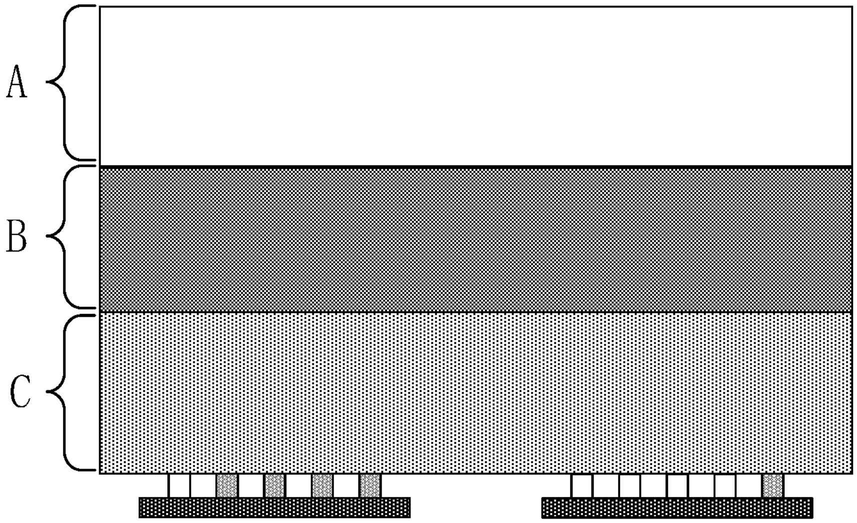
FIG. 1 (Prior art)

FIG. 1 is a schematic diagram of a charging effect of a conventional display device.

Figure 2:
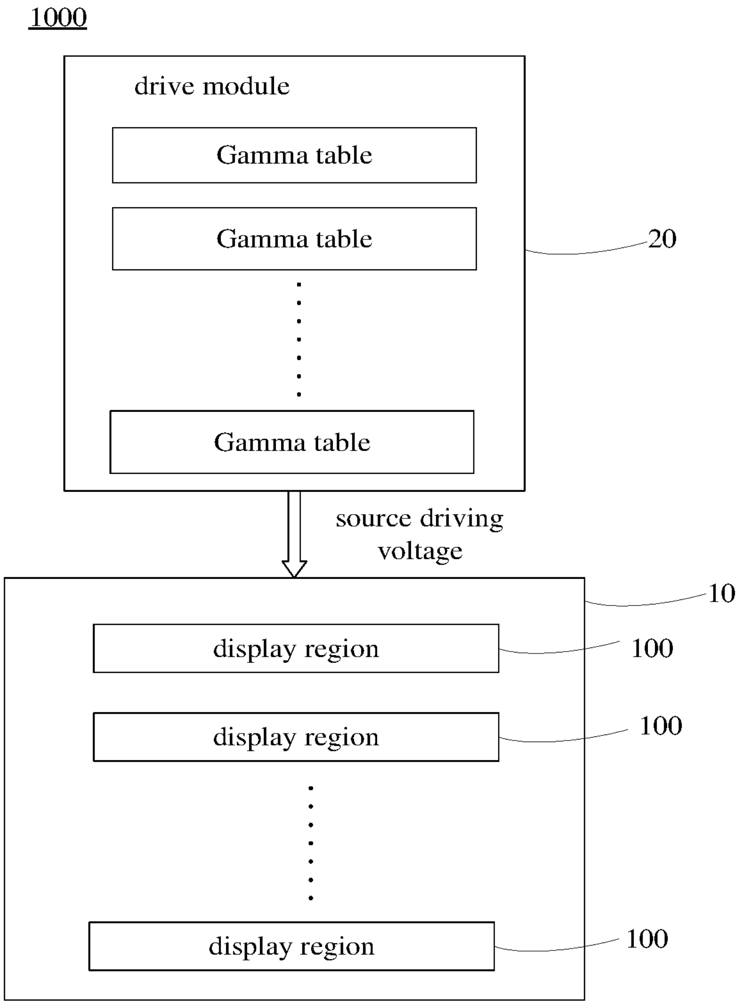

FIG. 2 is an exemplary diagram of a display device provided by an embodiment of present disclosure.

Figure 3:
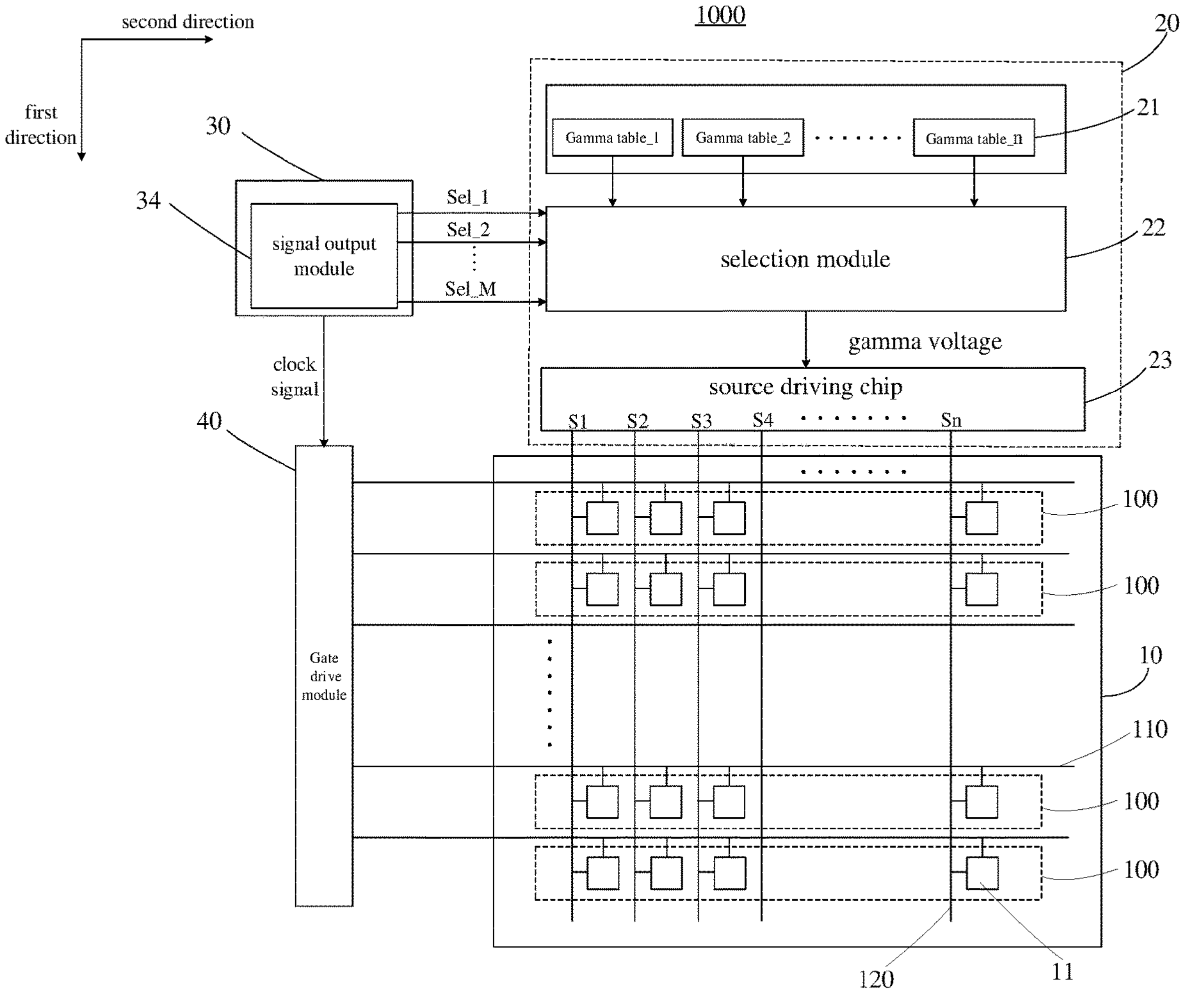

FIG. 3 is a schematic diagram of a first plan structure of a display device provided by an embodiment of the present disclosure.

Figure 4:
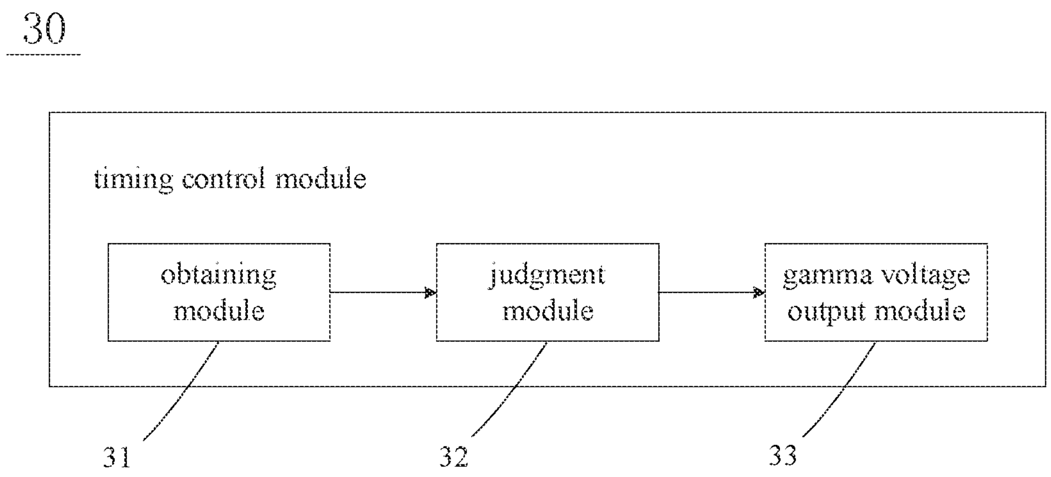

FIG. 4 is a schematic structural diagram of a timing control module provided by an embodiment of the present disclosure.

Figure 5:
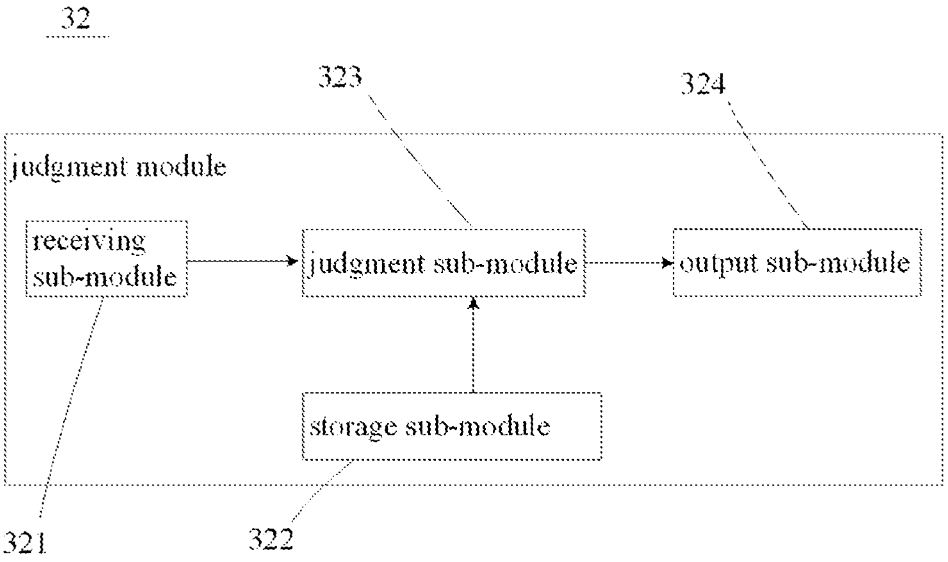

FIG. 5 is a schematic structural diagram of a judgment module provided by an embodiment of the present disclosure.

Figure 6:
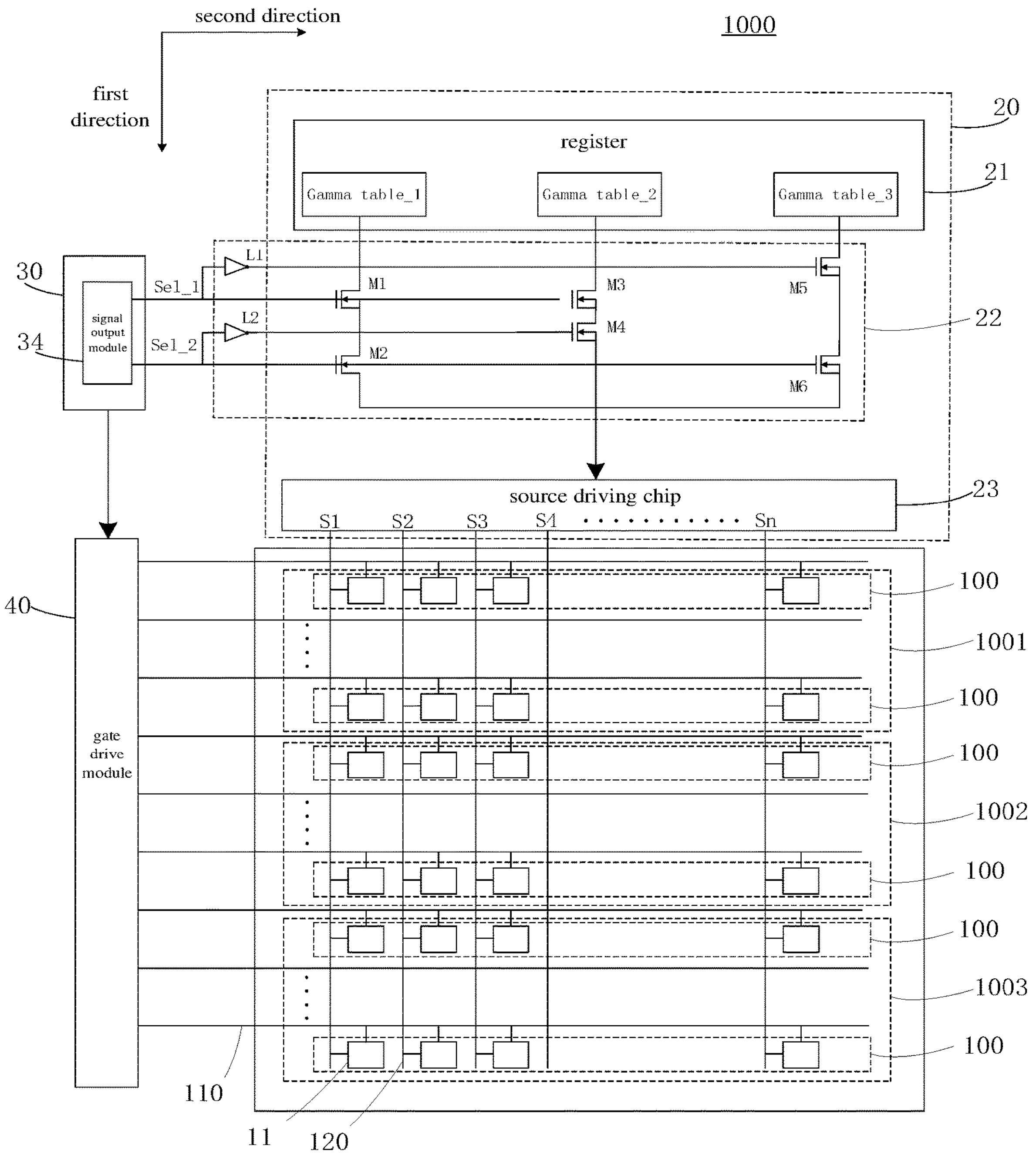

FIG. 6 is a schematic diagram of a second plan structure of the display device provided by an embodiment of the present disclosure.

Figure 7:
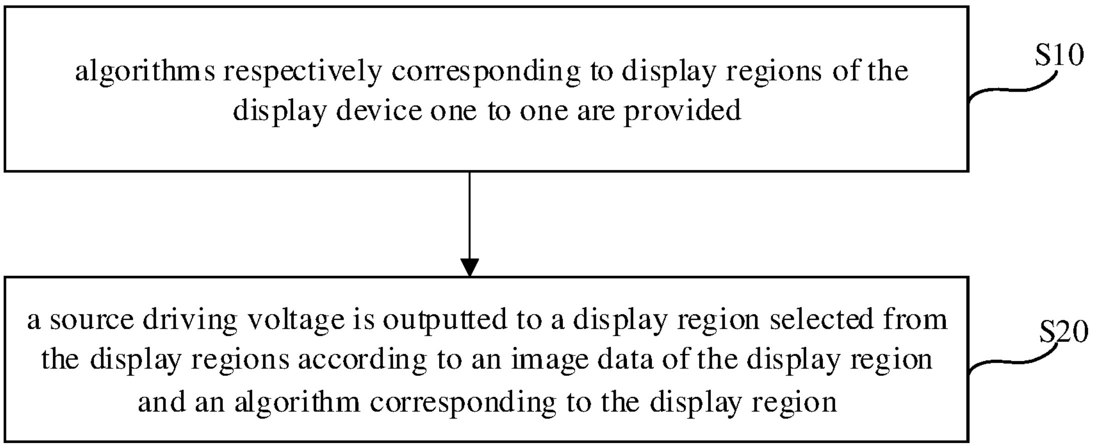

FIG. 7 is a flowchart of a driving method of a display unit provided by an embodiment of the present disclosure.

Figure 8:
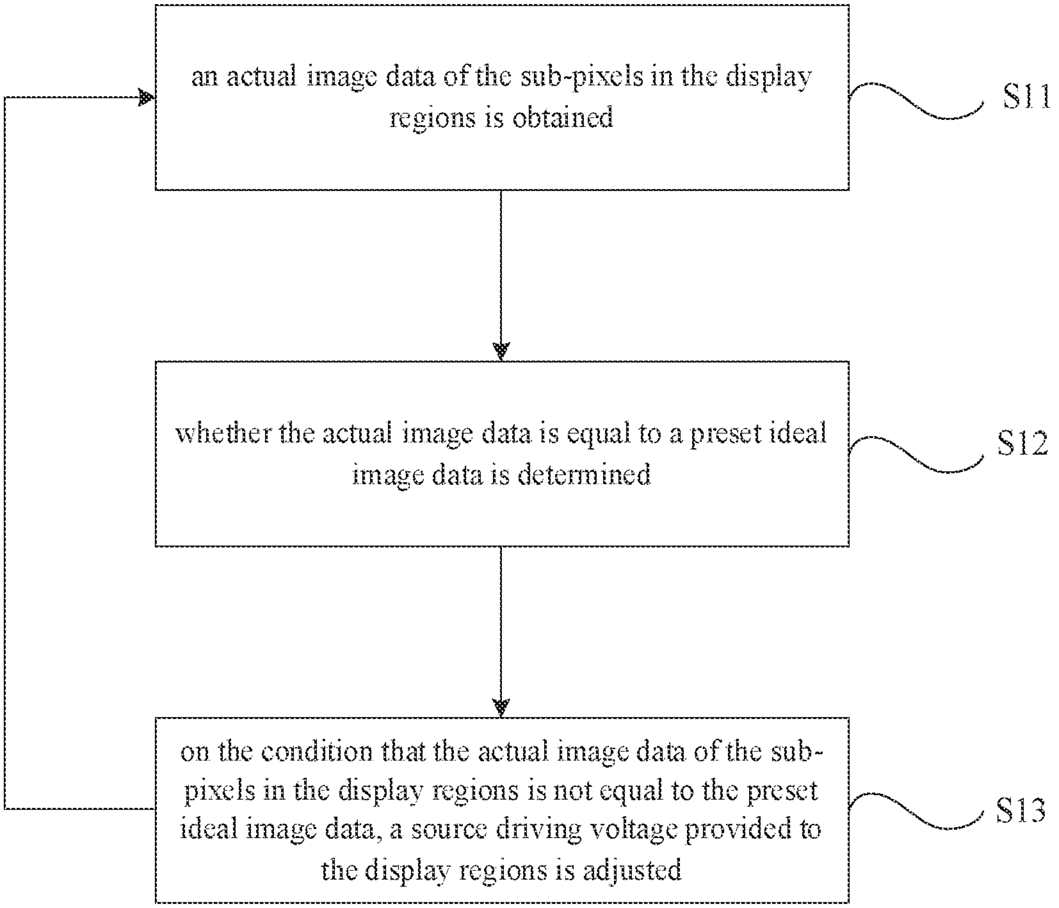

FIG. 8 is a flowchart of the adjustment algorithm in the driving method of the display device provided by an embodiment of the present disclosure.

EMBODIMENTS OF INVENTION

Detailed Description of Preferred Embodiments

The embodiments of the present disclosure provide a display device and its driving method, and a mobile terminal. In order to make a purpose, technical solutions, and effects of the present disclosure clearer, hereinafter, the embodiments of the present disclosure will be described in detail with reference to the drawings. It should be understood that the specific embodiments described here are only used to explain the present disclosure, and are not used to limit the present disclosure.

Referring to FIG. 1, a schematic diagram of a charging effect of a conventional display device is provided.

In a conventional display device, there is a technical problem of uneven display of the display panel. This problem is caused by a charging difference is caused by different RC loads of data lines and scan lines at the far and near terminals. As shown in area A, area B and area C in FIG. 1, The existing method to solve this problem is to adjust a phase of data signals and scanning signals to maintain charging time of each region of a liquid crystal panel near an optimal time. In an existing charging time maintenance method, it is difficult to ensure that all scan signals and data signals are adjusted to the optimal charging time. The charging time of each region of the liquid crystal panel is different, which makes display of the liquid crystal panel uneven. This method needs to be adjusted for each scan signal and data signal, therefore, there are problems such as a complicated adjustment process and low efficiency. Based on above mentioned reasons, the present disclosure provides a display device and its driving method to solve the above-mentioned problems.

Referring to FIG. 2-FIG.6, the embodiments of the present disclosure provide a display device 1000. The display device 1000 includes a display unit 10 and a driving circuit. The display unit 10 includes a plurality of display regions 100. The driving circuit is configured to drive the display unit 10, and the driving circuit includes a drive module 20.

The drive module 20 includes algorithms which are respectively correspond to the plurality of display regions 100 one to one, and the drive module 20 outputs a source driving voltage to a display region 100 selected from the plurality of display regions 100 according to an image data of the display region 100 and an algorithm corresponding to the display region 100.

In the present disclosure, algorithms which are respectively correspond to the plurality of display regions 100 one to on are set in a drive module 20, and the drive module 20 outputs a source driving voltage to a display region 100 selected from plurality of display regions 100 according to an image data of the display region 100 and an algorithm corresponding to the display region 100. Therefore, the present disclosure can effectively improve the display uniformity and improve the display quality of the display device.

In this embodiment, the algorithms include a way to obtain a driving voltage by a gamma table, the gamma table includes a gamma curve.

It should be noted that, in the display device, a relationship curve between a data signal voltage and a grayscale brightness is called a gamma curve. Take an 8 bit LCD panel as an example, it can display $2^8$=256 gray levels, corresponding to 256 different gamma voltages. Gamma voltage is to divide a change process from white to black into 2 to the power of N. The gamma curve can be set according to actual production, which is not further limited in this embodiment.

The technical solution of the present disclosure will be described with specific embodiments.

Refer to FIG. 2, an exemplary diagram of a display device is provided by an embodiment of the present disclosure.

The embodiments of the present disclosure provide a display device 1000. The display device 1000 includes a display unit 10 and a driving circuit. The display unit 10 includes a plurality of display regions 100. The driving circuit is configured to drive the display unit 10, and the driving circuit includes a drive module 20. The drive module 20 includes algorithms which are respectively correspond to the plurality of display regions 100 one to one, and the drive module 20 outputs a source driving voltage to a display region 100 selected from the plurality of display regions 100 according to an image data of the display region 100 and an algorithm corresponding to the display region 100.

In this embodiment, the algorithms include a way to obtain a driving voltage by a gamma table, the gamma table includes a gamma curve.

It should be noted that the gamma table in the FIG. 2 is a gamma table, and the gamma table below all refers to a gamma table.

In this embodiment, two adjoining gamma tables include different gamma curves. It should be noted that, in the display device, the relationship curve between the data signal voltage and the grayscale brightness is called a gamma curve. Take an 8 bit LCD panel as an example, it can display $2^8$=256 gray levels, corresponding to 256 different gamma voltages. Gamma voltage is to divide the change process from white to black into 2 to the power of N. The gamma curve can be set according to actual production, which is not further limited in this embodiment.

Specifically, please refer to FIG. 3, a schematic diagram of a first plan structure of the display device is provided by an embodiment of the present disclosure.

In this embodiment, the display device includes a display unit 10, the display unit 10 includes a plurality of display regions 100.

The display unit 10 includes sub-pixels 11 arranged in an array, and the display region 100 selected from the plurality of display regions includes one row of the sub-pixels 11 or multiple adjoining rows of the sub-pixels 11.

Specifically, in this embodiment, the display device includes a plurality of scan lines 110 extending in a horizontal direction and a plurality of data lines 120 extending in a vertical direction. The plurality of scan lines 110 and the plurality of data lines 120 intersect to define the sub-pixel 11.

The display unit 10 includes n display regions 100 arranged in a first direction. The display regions 100 selected from the plurality of display regions 100 includes a plurality of the sub-pixels 11 arranged along a second direction. The first direction is perpendicular to the second direction. Any one of the display regions 100 includes a row of the sub-pixels 11, and n is a positive integer.

It should be noted that a plurality of the display regions 100 are arranged along a direction in which the scan lines 110 are arranged, that is, the first direction described in this embodiment is a direction in which a plurality of scan lines 110 are arranged. A plurality of the sub-pixels 11 in any one of the display regions 100 are arranged along a direction in which the data lines 120 are arranged, that is, the second direction described in the embodiment of the present disclosure is a direction in which a plurality of the data lines 120 are arranged.

In this embodiment, the drive module 20 further includes a register 21, and the algorithms are stored in the register 21.

Specifically, the gamma table is stored in the register 21. The register 21 includes n groups of gamma tables corresponding to the n display regions 100 one-to-one. Two adjoining gamma tables include different gamma curves.

Please refer to FIG. 4, a schematic structural diagram of a timing control module is provided by an embodiment of the present disclosure.

In this embodiment, the driving circuit further includes a timing control module 30, the timing control module 30 includes an obtaining module 31, a judgment module 32, and a gamma voltage output module 33.

The obtaining module 31 is configured to obtain an actual image data of the sub-pixels 11 in the display regions 100. The judgment module 32 is configured to determine whether the actual image data is equal to a preset ideal image data, on the condition that the actual image data of the sub-pixels 11 in the display regions 100 is not equal to the preset ideal image data, the judgment module will output an adjustment signal to the gamma voltage output module. The gamma voltage output module 33 adjusts an adjustment gamma voltage outputted to the register 21 after receiving the adjustment signal, until an obtained actual image data of the sub-pixels 11 in the display regions 100 is equal to the preset ideal image data. The timing control module 30 adjusts the algorithms in the register 21 according to an adjusted adjustment gamma voltage, namely, the timing control module 30 adjusts the gamma table in the register 21 according to the adjusted adjustment gamma voltage.

Specifically, please refer to FIG. 5, a schematic structural diagram of the judgment module is provided by an embodiment of the present disclosure.

In this embodiment, the judgment module 32 further includes a receiving sub-module 321, a storage sub-module 322, a judgment sub-module 323, and an output sub-module 324. The receiving sub-module 321 is configured to receive the actual image data output by the acquiring module 31. The storage sub-module 322 is configured to store the preset ideal image data. The judging sub-module 323 is configured to judge whether the actual image data is not equal to the preset ideal image data in the storage module, on the condition that the actual image data of the sub-pixel 11 in any one of the display regions 100 is not equal to the preset ideal image data, the adjustment signal is calculated according to the actual image data and the preset ideal image data. The output sub-module 324 is configured to output the adjustment signal to the gamma voltage output module 33.

In this embodiment, the drive module 20 further includes a selection module 22 and a source driver chip 23, and the timing control module 30 further includes a signal output module 34.

The signal output module 34 outputs multiple selection signals to the selection module 22. The selection module 22 selects the algorithms corresponding to the display regions 100 and outputs the gamma voltage to the source driver chip 23 according to the selection signal. The source driving chip 23 outputs the source driving voltage to drive the corresponding sub-pixels 11 in the display region to charge.

Specifically, the selection module 22 selects a gamma table corresponding to the display regions 100 and outputs a gamma voltage to the source driver chip 23 according to the selection signal.

In this embodiment, the selection signal output module 34 outputs M selection signals to the selection module 22, M is a positive integer, and n is less than 2 to the M power and greater than 2 to the M−1 power.

In this embodiment, the driving circuit also includes a gate drive module 40. The gate drive module 40 provides a scan signal to the display region 100 to turn on the corresponding sub-pixel 11.

In this embodiment, the signal output module 34 in the timing control module 30 is configured to output multiple selection signals to the selection module 22. The selection module 22 selects the algorithms corresponding to the display regions 100 according to the selection signal. The selection module 22 outputs the gamma voltage to the source driver chip 23. The source driving chip 23 outputs the source driving voltage to drive the corresponding sub-pixels 11 in the display regions to charge. Therefore, a charging voltage of the sub-pixels 11 on each of the display regions 100 can be adjusted, which can effectively improve the display uniformity and improve the display quality of the display device.

Please refer to FIG. 6, a schematic diagram of the second plan structure of the display device is provided by the embodiment of the present disclosure.

In this embodiment, the display unit 10 includes a first display region 1001, a second display region 1002, and a third display region 1003 arranged in a first direction. The first display region 1001, the second display region 1002, and the third display region 1003 each include a plurality of sub-pixels 11 arranged in a second direction. The first direction is perpendicular to the second direction.

The first display region 1001, the second display region 1002, and the third display region 1003 all include one row or multiple adjoining rows of the sub-pixels 11. It can be understood that the number of rows of the sub-pixels 11 is not specifically limited in this embodiment.

It should be noted that, in this embodiment, the display device includes a plurality of scan lines 110 extending in a horizontal direction and a plurality of data lines 120 extending in a vertical direction. The plurality of scan lines 110 and the plurality of data lines 120 intersect to define the sub-pixel 11. The first display region 1001, the second display region 1002, and the third display region 1003 are all arranged along the direction in which the scan lines 110 are arranged, that is, the first direction described in this embodiment is a direction in which a plurality of scan lines 110 are arranged. A plurality of the sub-pixels 11 in any one of the display regions 100 are arranged along the direction in which the data lines 120 are arranged, that is, the second direction described in the embodiment of the present disclosure is a direction in which a plurality of the data lines 120 are arranged.

In this embodiment, the drive module 20 further includes a register 21, and the algorithms is stored in the register 21.

Specifically, the gamma table is stored in the register 21. The register 21 includes a first algorithm corresponding to the first display region 1001, a second algorithm corresponding to the second display region 1002, and a third algorithm corresponding to the third display region 1003. The gamma curves included in the first algorithm, the second algorithm, and the third algorithm are all different.

The register 21 includes a first gamma table corresponding to the first display region 1001, a second gamma table corresponding to the second display region 1002, and a third gamma table corresponding to the third display region 1003. The gamma curves included in the first gamma table, the second gamma table, and the third gamma table are all different.

It should be noted that, in FIG. 6, the first Gamma table is Gamma table_1, the second Gamma table is Gamma table_2, and the third Gamma table is Gamma table_3. Hereinafter, the first Gamma table refers to Gamma table_1, the second Gamma table refers to Gamma table_2, and the third Gamma table refers to Gamma table_3.

In this embodiment, the drive module 20 further includes a selection module 22 and a source driving chip 23. The driving circuit further includes a timing control module 30. The timing control module 30 includes a signal output module 34.

The signal output module 34 outputs the first selection signal Sel_1 and the second selection signal Sel_2 to the selection module 22.

The selection module 22 includes a first MOS transistor M1, a second MOS transistor M2, a third MOS transistor M3, a fourth MOS transistor M4, a fifth MOS transistor M5, a sixth MOS transistor M6, a first inverter L1, and a second inverter L2. The MOS transistor includes but is not limited to a metal oxide half field effect transistor, which is not specifically limited in this embodiment.

Specifically, in this embodiment, the first selection signal Sel_1 is input to a gate electrode of the first MOS transistor M1 and the gate electrode of the third MOS transistor M3. The first selection signal Sel_1 is input to the gate electrode of the fourth MOS transistor M4 through the first inverter L1. The second selection signal Sel_2 is input to the gate electrode of the second MOS transistor M2 and the gate electrode of the sixth MOS transistor M6. The second selection signal Sel_2 is input to the gate electrode of the fifth MOS transistor M5 through the first inverter L1.

In this embodiment, the display device further includes a gate drive module 40, which provides scanning signals to the display region, a corresponding sub-pixel 11 is turned on.

When the first display region 1001 receives a scan signal, the first selection signal Sel_1 and the second selection signal Sel_2 are both high. The first MOS transistor M1 is turned on in response to the first selection signal Sel_1, and the second MOS transistor M2 is turned on in response to the second selection signal Sel_2. The first gamma table outputs a first gamma voltage to the source driver chip 23. The source driving chip 23 outputs a source driving voltage to drive the corresponding sub-pixel 11 in the first display region 1001 to charge.

When the second display region 1002 receives a scanning signal, the first selection signal Sel_1 is at a high level, and the second selection signal Sel_2 is at a low level. The third MOS transistor M3 is turned on in response to the first selection signal Sel_1, and the fourth MOS transistor M4 is turned on in response to the second selection signal Sel_2 through the first inverter L1. The second gamma table outputs a second gamma voltage to the source driver chip 23. The source driving chip 23 outputs the source driving voltage to drive the corresponding sub-pixel 11 in the second display region 1002 to charge.

When the third display region 1003 receives a scan signal, the first selection signal Sel_1 is at a low level, and the second selection signal Sel_2 is at a high level. The fifth MOS transistor M5 is turned on in response to the first selection signal Sel_1 through the first inverter L1, and the sixth MOS transistor M6 is turned on in response to the second selection signal Sel_2. The third gamma table outputs a third gamma voltage to the source driver chip 23. The source driving chip 23 outputs the source driving voltage to drive the corresponding sub-pixel 11 in the third display region 1003 to charge.

It should be noted that the display unit 10 includes the first display region 1001, the second display region 1002, and the third display region 1003. The register 21 includes the first algorithm corresponding to the first display region 1001, the second algorithm corresponding to the second display region 1002, and the third algorithm corresponding to the third display region 1003. The signal output module outputs the first selection signal Sel_1 and the second selection signal Sel_2 to the selection module 22. this is only used as an example, and this embodiment does not specifically limit this.

In this disclosure, the first algorithm corresponding to the first display region 1001, the second algorithm corresponding to the second display region 1002, and the third algorithm corresponding to the third display region 1003 are set in the drive module 20. The drive module 20 outputs a source driving voltage to the first display region 1001, the second display region 1002, and the third display region 1003 according to the image data of the first display region 1001, the second display region 1002, the third display region 1003, the first algorithm corresponding to the first display region 1001, the second algorithm corresponding to the second display region 1002, and the third algorithm corresponding to the third display region 1003. Therefore, the display uniformity can be effectively improved, and the display quality of the display device can be improved.

Please refer to FIG. 7, a flowchart of a driving method of a display device provided by an embodiment of the present disclosure.

The embodiments of the present disclosure provide a driving method of a display device, and the driving method includes steps of:

S10: algorithms respectively corresponding to display regions of the display device one to one are provided.

Please refer to FIG. 8, a flowchart of the adjustment algorithm in the driving method of the display device provided by the embodiment of the present disclosure.

In this embodiment, the display device includes a display unit. The display unit 10 includes sub-pixels 11 arranged in an array, and the display region 100 selected from the plurality of display regions includes one row of the sub-pixels 11 or multiple adjoining rows of the sub-pixels 11. the step S10 includes S11: an actual image data of the sub-pixels in the display regions is obtained.

S12: whether the actual image data is equal to a preset ideal image data is determined.

S13: on the condition that the actual image data of the sub-pixels in the display regions is not equal to the preset ideal image data, a source driving voltage provided to the display regions is adjusted.

S14: steps S11-S13 are repeated until an obtained actual image data of the sub-pixels in the display regions is equal to the preset ideal image data, and the algorithms corresponding to the display regions are formed according to the actual image data of the sub-pixels in the display regions and the source driving voltage provided to the display regions.

S20: a source driving voltage is outputted to a display region selected from the display regions according to an image data of the display region and an algorithm corresponding to the display region.

In this embodiment, the step S20 includes:

S21: a signal output module of the display device outputs selection signals to a selection module of the display device.

S22: the selection module selects the algorithms corresponding to the display regions according to the selection signals, and outputting a gamma voltage to a source driver chip of the display device.

S23: the source driving chip outputs the source driving voltage to drive the sub-pixels corresponding to the display regions to charge.

In the present disclosure, algorithms which are respectively correspond to the plurality of display regions one to on are set in a drive module 20, and the drive module 20 outputs a source driving voltage to a display region 100 selected from the plurality of display regions 100 according to an image data of the display region 100 and an algorithm corresponding to the display region 100. The present disclosure can effectively improve the display uniformity and improve the display quality of the display device.

In this embodiment, the algorithms include a way to obtain a driving voltage by a gamma table, the gamma table includes a gamma curve.

It should be noted that, in the display device, a relationship curve between a data signal voltage and a grayscale brightness is called a gamma curve. Take an 8 bit LCD panel as an example, it can display 28=256 gray levels, corresponding to 256 different gamma voltages. Gamma voltage is to divide a change process from white to black into 2 to the power of N. The gamma curve can be set according to actual production, which is not further limited in this embodiment.

The present disclosure further provides a mobile terminal. The mobile terminal includes a terminal body and a display device, and the terminal body is electrically connected to the display device.

The display device has been described in detail in above embodiments, and the description will not be repeated here.

In specific disclosures, the mobile terminal may be a smart phone, a tablet computer, a notebook computer, a smart bracelet, a smart watch, smart glasses, a smart helmet, a desktop computer, a smart TV, or a digital camera and other devices. The mobile terminal can even be applied to an electronic device with a flexible display screen.

In summary, the embodiments of the present disclosure provide the display device and its driving method, and the mobile terminal. The display device includes the display unit and the driving circuit. The display unit includes the plurality of display regions. The driving circuit is configured to drive the display unit, and the driving circuit includes the drive module. The drive module includes algorithms which are respectively correspond to the plurality of display regions one to one, and the drive module outputs the source driving voltage to the display region selected from the plurality of display regions according to the image data of the display region and the algorithm corresponding to the display region. In the present disclosure, algorithms which are respectively correspond to the plurality of display regions one to on are set in a drive module, and the drive module outputs a source driving voltage to the display region selected from the plurality of display regions according to the image data of the display region and the algorithm corresponding to the display region. Therefore, the present disclosure can effectively improve the display uniformity and improve the display quality of the display device.

In the above embodiments, the description of each embodiment has its own emphasis, for a part that is not detailed in an embodiment, you can refer to the related descriptions of other embodiments.

It can be understood that, for those of ordinary skill in the art, equivalent replacements or changes can be made according to the technical solution of the present disclosure and its inventive concept, and all these changes or replacements shall fall within the protection scope of the appended claims of the present disclosure.

What is claimed is:

1. A display device, comprising:

a display unit, the display unit comprises a plurality of display regions; and a driving circuit, configured to drive the display unit, and the driving circuit comprises a driver, wherein the driver comprises algorithms which are respectively correspond to the plurality of display regions one to one, and the driver outputs a source driving voltage to a display region selected from the plurality of display regions according to an image data of the display region and an algorithm corresponding to the display region, wherein the display unit comprises sub-pixels arranged in an array, and the display region selected from the plurality of display regions comprises one row of the sub-pixels or multiple adjoining rows of the sub-pixels, wherein the driver further comprises a register, and the algorithms are stored in the register, wherein the driving circuit further comprises a timing controller, the timing controller comprising a collector, a discriminator, and a gamma voltage output, wherein the collector is configured to obtain an actual image data of the sub-pixels in the display regions, wherein the discriminator is configured to determine whether the actual image data is equal to a preset ideal image data, and on the condition that the actual image data of the sub-pixels in the display regions is not equal to the preset ideal image data, the discriminator outputs an adjustment signal to the gamma voltage output, wherein the gamma voltage output adjusts an adjustment gamma voltage outputted to the register after receiving the adjustment signal, until an obtained actual image data of the sub-pixels in the display regions is equal to the preset ideal image data, and wherein the timing controller adjusts the algorithms in the register according to an adjusted adjustment gamma voltage.

2. The display device of claim 1, wherein:

the driver further comprises a selector and a source driving chip, the driving circuit further comprises a timing controller, and the timing controller comprises a signal output;

the signal output outputs selection signals to the selector;

the selector controls the algorithms corresponding to the display regions to output a gamma voltage to the source driver chip according to the selection signals; and the source driving chip drives the sub-pixels corresponding to the display regions to charge through the gamma voltage.

3. The display device of claim 1, wherein the discriminator comprises a storage sub-module, and the preset ideal image data is stored in the storage sub-module.

4. The display device of claim 1, wherein the algorithms comprise a way to obtain a driving voltage by a gamma table, the gamma table comprises a gamma curve, and the gamma curve is a relationship curve between a data signal voltage and a grayscale brightness.

5. The display device of claim 4, wherein two adjoining gamma tables comprise different gamma curves.

6. A driving method of a display device, the driving method comprising steps of:

S10: providing algorithms respectively corresponding to display regions of the display device one to one; and S20: outputting a source driving voltage to a display region selected from the display regions according to an image data of the display region and an algorithm corresponding to the display region, wherein the display device comprises a display unit, the display unit comprises sub-pixels arranged in an array, and the display region comprises one row of the sub-pixels or multiple adjoining rows of the sub-pixels, and wherein the step S10 comprises:

S11: obtaining an actual image data of the sub-pixels in the display regions;

S12: determining whether the actual image data is equal to a preset ideal image data;

S13: on the condition that the actual image data of the sub-pixels in the display regions is not equal to the preset ideal image data, adjusting a source driving voltage provided to the display regions; and S14: repeating steps S11-S13 until an obtained actual image data of the sub-pixels in the display regions is equal to the preset ideal image data, and forming the algorithms corresponding to the display regions according to the actual image data of the sub-pixels in the display regions and the source driving voltage provided to the display regions.

7. The driving method of a display device of claim 6, wherein the step S20 comprises:

S21: outputting, by a signal output module of the display device, selection signals to a selector of the display device;

S22: selecting, by the selector, the algorithms corresponding to the display regions according to the selection signals, and outputting a gamma voltage to a source driver chip of the display device; and S23: outputting, by the source driving chip, the source driving voltage to drive the sub-pixels corresponding to the display regions to charge.

8. A mobile terminal, the mobile terminal comprising a terminal body and display device, the terminal body being electrically connected to the display device, the display device comprising:

a display unit, the display unit comprising a plurality of display regions; and a driving circuit configured to drive the display unit, the driving circuit comprising a driver, wherein the driver comprises algorithms which are respectively correspond to the plurality of display regions one to one, and the driver outputs a source driving voltage to a display region selected from the plurality of display regions according to an image data of the display region and an algorithm corresponding to the display region, wherein the display unit comprises sub-pixels arranged in an array, and the display region selected from the display regions comprises one row of the sub-pixels or multiple adjoining rows of the sub-pixels, wherein the driver further comprises a register, and the algorithms are stored in the register, wherein the driving circuit further comprises a timing controller, the timing controller comprising a collector, a discriminator, and a gamma voltage output, wherein the collector is configured to obtain an actual image data of the sub-pixels in the display regions, wherein the discriminator is configured to determine whether the actual image data is equal to a preset ideal image data, and on the condition that the actual image data of the sub-pixels in the display regions is not equal to the preset ideal image data, the discriminator outputs an adjustment signal to the gamma voltage output, wherein the gamma voltage output adjusts an adjustment gamma voltage outputted to the register after receiving the adjustment signal, until an obtained actual image data of the sub-pixels in the display regions is equal to the preset ideal image data, and wherein the timing controller adjusts the algorithms in the register according to an adjusted adjustment gamma voltage.

9. The mobile terminal of claim 8, wherein:

the driver further comprises a selector and a source driving chip, the driving circuit further comprises a timing controller, and the timing controller comprises a signal output;

the signal output outputs selection signals to the selector;

the selector controls the algorithms corresponding to the display regions to output a gamma voltage to the source driver chip according to the selection signals; and the source driving chip drives the sub-pixels corresponding to the display regions to charge through the gamma voltage.

10. The mobile terminal of claim 8, wherein the discriminator comprises a storage sub-module, and the preset ideal image data is stored in the storage sub-module.

11. The mobile terminal of claim 8, wherein the algorithms comprise a way to obtain a driving voltage by a gamma table, the gamma table comprises a gamma curve, and the gamma curve is a relationship curve between a data signal voltage and a grayscale brightness.

12. The mobile terminal of claim 11, wherein two adjoining gamma tables comprise different gamma curves.

* * * * *